No. 721,111. PATENTED FEB. 17, 1903.
T. WAITE.
APPARATUS FOR SOFTENING, FILTERING, AND PURIFYING WATER.
APPLICATION FILED MAY 19, 1902.
NO MODEL. 2 SHEETS—SHEET 1.
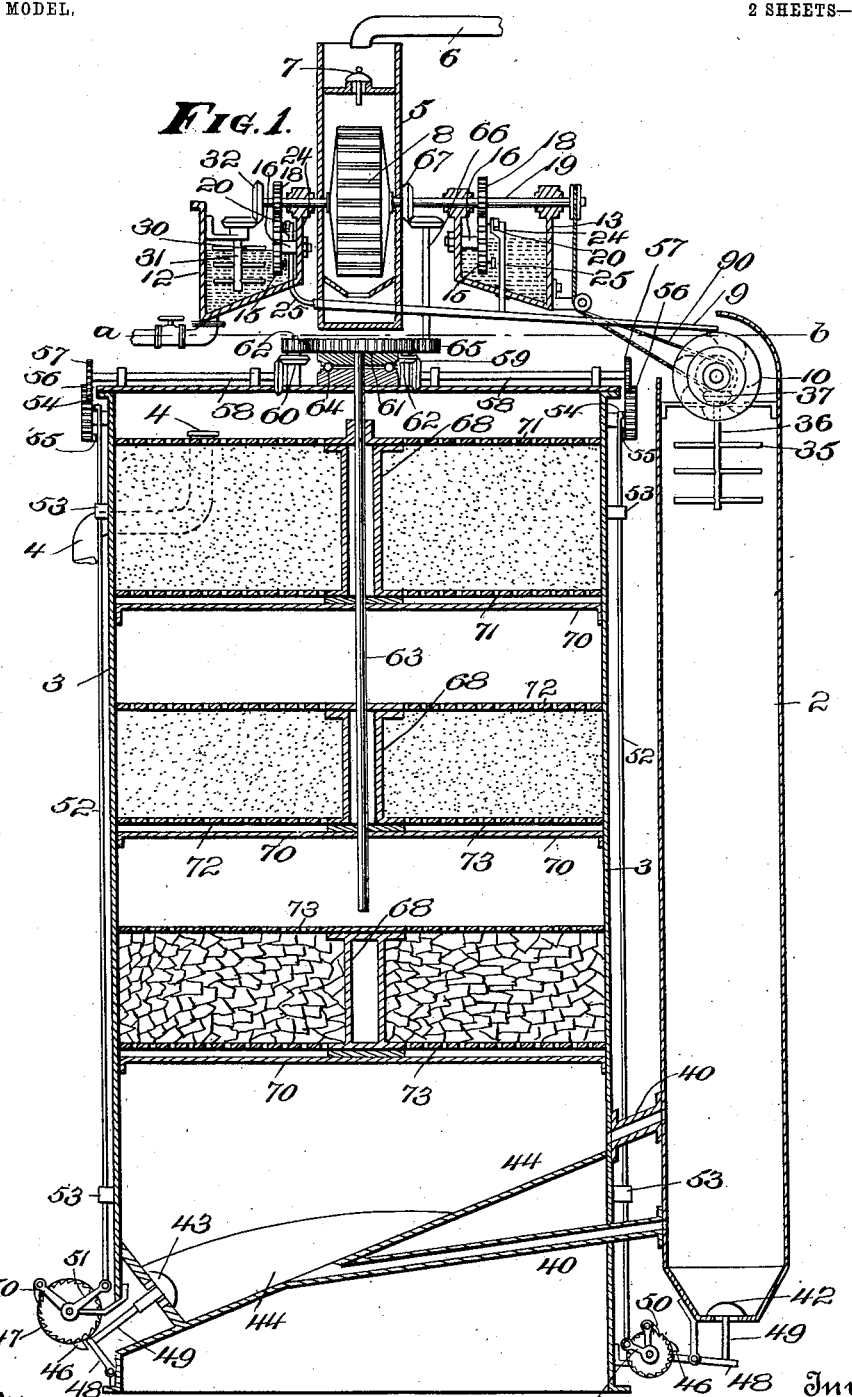

No. 721,111. PATENTED FEB. 17, 1903.
T. WAITE.
APPARATUS FOR SOFTENING, FILTERING, AND PURIFYING WATER.
APPLICATION FILED MAY 19, 1902.
NO MODEL. 2 SHEETS—SHEET 2.
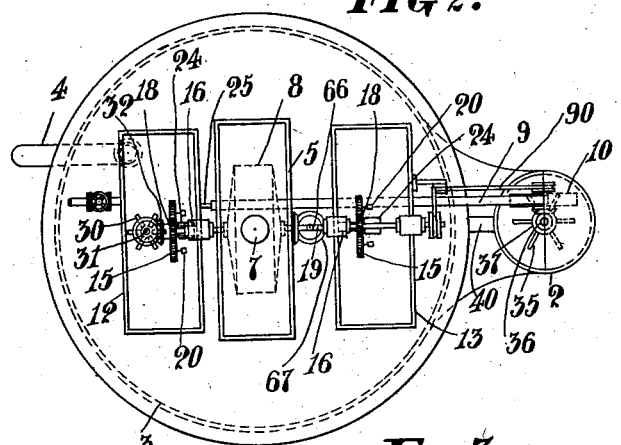
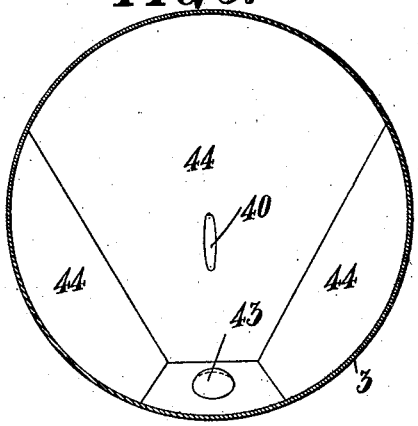
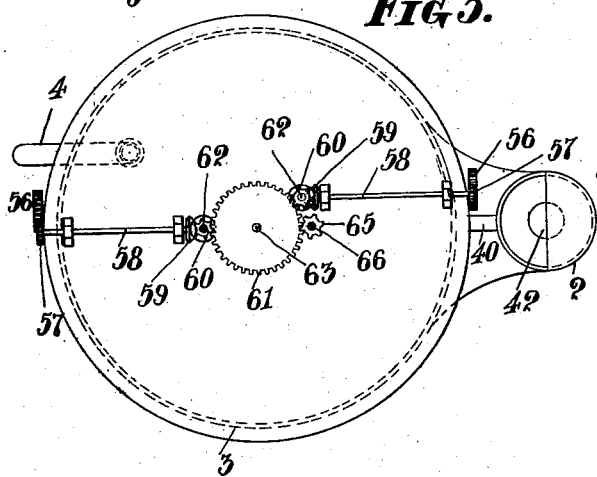
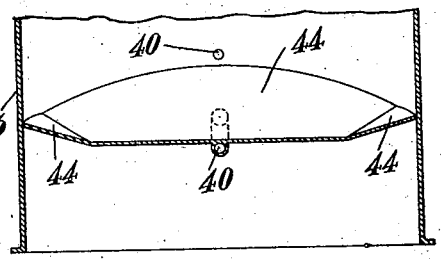
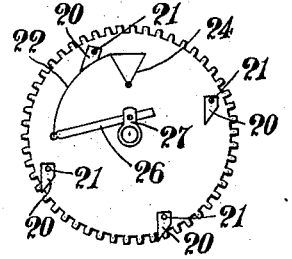

UNITED STATES PATENT OFFICE.

THOMAS WAITE, OF BRADFORD, ENGLAND.

APPARATUS FOR SOFTENING, FILTERING, AND PURIFYING WATER.

SPECIFICATION forming part of Letters Patent No. 721,111, dated February 17, 1903.

Application filed May 19, 1902. Serial No. 108,064. (No model.)

*To all whom it may concern:*

Be it known that I, THOMAS WAITE, a subject of the King of England, residing at 111 Otley road, Bradford, England, have invented certain new and useful Improvements in Apparatus for Softening, Filtering, and Purifying Water, of which the following is a specification.

The primary objects of my invention are to provide efficient means for automatically and uniformly introducing the softening element or other ingredient and periodically discharging the sedimentary matter and also to mechanically and automatically separate the unprecipitated solid matter.

Referring to the drawings which form a part of this specification, Figure 1 represents a vertical section of my apparatus. Fig. 2 is a plan view. Fig. 3 is a sectional plan on the broken line *a b*. Fig. 4 is a detail side view of the bucket-wheel. Fig. 5 is a sectional plan view showing the interior of the bottom of the vessel. Fig. 6 is a detail sectional view of the lower part of the bottom at right angles to Fig. 1.

Two cylindrical vessels 2 and 3 are employed, and the liquid to be treated passes into the top of the smaller vessel 2 and down through it and from thence up the vessel 3 during treatment and escapes by the overflow-pipe 4.

A tank 5 is provided above the vessel 3 to receive the liquid from the admission-pipe 6 to be treated. The liquid flows through the valve 7 onto the overshot water-wheel or turbine 8 and revolving it falls onto the top of the chute 9, down which it flows onto the top of the overshot water-wheel 10 and into the vessel 2.

The ingredients to be added are contained in tanks outside the tank 5. Two of these, 12 and 13, are shown in the drawings. The tank 12 may contain lime and water, and 13 any other element it is desired to add to the liquid to be treated. Stud-wheels 15 are mounted on the studs 16 in the tanks, and these wheels are driven by pinions 18 on the shaft 19 of the wheel 8. Buckets 20 are pivoted on the face of the wheel 15. The center of gravity of these buckets is sufficiently below the studs 21, by which they are pivoted, that they always assume a vertical position while the wheels 15 revolve until they reach the adjustable tipping curve 22, which causes them to turn and empty more or less of their contents into the hoppers 24, connected by the pipes 25 to the chute 9. The top of the curve 22 is hinged to the hopper 24, and its lower end is supported by the rod 26, adjustably fixed in the stationary eye 27. Fig. 4 is a separate side view of the wheel 15 and certain other parts on a larger scale. According to the position of the lower end of the curve 22 a greater or less quantity of the contents of the buckets is discharged before they reach the hoppers.

A stirrer consisting of radial arms 30 on a vertical shaft 31, driven by the bevel-wheels 32 from the shaft 19, is provided in the tank
12. A similar stirrer may be provided in the other tank, if required.

The water-wheel 10 is arranged to drive a stirrer 35 from its shaft 36 by the bevel-wheels 37. This stirrer is provided to thoroughly mix the liquid flowing into the vessel 2.

The lower part of the vessel 2 has preferably two passages 40, communicating with the interior of the vessel 3, and its lower end is fitted with a sludge or sediment discharge valve 42. A similar discharge-valve 43 is provided in the bottom of the vessel 3. This valve is preferably located at one side and the bottom 44 of the vessel made to slope toward it from all sides. Fig. 5 is a plan view of the bottom, and Fig. 6 is a diametrical section at right angles to Fig. 1.

The valves 42 and 43 are periodically opened to discharge the sediment accumulating at the bottom of the tanks by the projections 46 on the ratchet-wheels 47 engaging the levers 48, which lift the valve-spindle 49 as the projections pass such levers and hold them open until the projections disengage the levers. The ratchet-wheels 47 are intermittently driven by their pawls 50 on the bell-crank levers 51, actuated by the vertical rods 52, working through guide-eyes 53, having horizontally-projecting ends 54, which engage the studs 55 in the wheels 56 as the studs pass and lift the rods sufficiently to move the ratchet-wheels each time the wheels 56 revolve. The wheels 56 are driven by the wheels 57 on the shafts 58, and the shafts are driven by the bevel-wheels 59, the pinions 60, and the wheel 61 on the vertical shaft 63, mounted concentric with the vessel 3. The wheel 61 and shaft 63 are preferably mounted on ball-bearings 64, and they are driven by the pinion 65 on the vertical shaft 66, connected by the bevel-wheels 67 to the shaft 19. The shaft 63 passes down through supporting-sleeves 68, carried by cross-bars 70.

Pairs of perforated horizontal plates or partitions 71, 72, and 73 are fixed across the vessel 3, and between these pairs of plates any suitable filtering medium is placed, so as to filter the liquid as it passes upwardly through them.

Having now described my invention, what I claim as new, and desire to secure by Letters Patent, is—

1. In apparatus for softening, filtering and purifying water the combination with a water-motor actuated by the inflowing liquid, a delivery-chute 9 and tanks which hold the reagents, of a bucket-wheel 15, placed in each reagent-tank geared to the motor and provided with a number of elevator-buckets to lift the reagents, a chute 24, through which the reagent is delivered from the buckets to the delivery-chute 9, a tank to which the said chute directs the liquid, a valve controlling the outlet from the said tank and connections between said valve and the water-motor to open the said valve periodically, substantially as described.

2. In apparatus for softening, filtering and purifying water, the combination with a motor actuated by the inflowing water, a delivery-chute for the water, reagent-tanks, of bucket-wheels placed in each reagent-tank operated by the motor to deliver the reagents, a settling-tank 2, to receive the water, a purifying-tank 3, a pipe 40 connecting the tanks 2 and 3, valves 42 and 43 placed in the bottom of the tanks 2 and 3 respectively, ratchet-wheels 47 with projections 46 to open the valves periodically and mechanism connecting the ratchet-wheels with the water-motor substantially as described.

In witness whereof I have hereunto set my hand in presence of two witnesses.

THOMAS WAITE.

Witnesses:
  CECIL A. S. BAXTER,
  DAVID NOWELL.